US011608864B2

(12) United States Patent
Gelmini et al.

(10) Patent No.: US 11,608,864 B2
(45) Date of Patent: Mar. 21, 2023

(54) HYDRAULIC SYSTEM AND PISTON FILLING CONTROL

(71) Applicant: DANA ITALIA S.R.L., Trentino (IT)

(72) Inventors: Mario Gelmini, Arco (IT); Pier Paolo Rinaldi, Arco (IT)

(73) Assignee: DANA ITALIA S.R.L., Arco (IT)

( * ) Notice: Subject to any disclaimer, the term of this patent is extended or adjusted under 35 U.S.C. 154(b) by 0 days.

(21) Appl. No.: 17/655,482

(22) Filed: Mar. 18, 2022

(65) Prior Publication Data

US 2022/0316537 A1 Oct. 6, 2022

Related U.S. Application Data

(60) Provisional application No. 63/169,056, filed on Mar. 31, 2021.

(51) Int. Cl.
*F16D 48/06* (2006.01)

(52) U.S. Cl.
CPC .... *F16D 48/066* (2013.01); *F16D 2500/3024* (2013.01); *F16D 2500/3026* (2013.01); *F16D 2500/30803* (2013.01); *F16D 2500/7041* (2013.01); *F16D 2500/70406* (2013.01)

(58) Field of Classification Search
None
See application file for complete search history.

(56) References Cited

U.S. PATENT DOCUMENTS

| 8,062,174 | B2 | 11/2011 | Sah et al. | |
| 8,308,608 | B2 | 11/2012 | Wilke et al. | |
| 9,051,974 | B2 | 6/2015 | Gramann et al. | |
| 9,140,337 | B2 | 9/2015 | Sah et al. | |
| 9,841,067 | B1* | 12/2017 | Logan | F16D 25/10 |
| 2006/0272919 | A1* | 12/2006 | Kawamoto | F16H 61/061 192/109 F |
| 2010/0087999 | A1 | 4/2010 | Neelakantan et al. | |
| 2010/0250079 | A1* | 9/2010 | Kawamoto | F16D 48/066 701/68 |
| 2011/0190990 | A1* | 8/2011 | Nedachi | F16H 57/0006 74/473.11 |
| 2011/0208396 | A1* | 8/2011 | Otanez | F16D 48/066 701/67 |
| 2012/0232766 | A1* | 9/2012 | Einfinger | F16D 48/066 701/67 |
| 2012/0298466 | A1* | 11/2012 | Nedachi | F16D 48/06 192/84.6 |
| 2015/0308523 | A1* | 10/2015 | Thornton | F16D 25/0638 701/68 |
| 2016/0069402 | A1* | 3/2016 | Chimner | F16D 48/066 701/67 |

FOREIGN PATENT DOCUMENTS

DE 4013667 A1 11/1991
DE 10236540 A1 2/2003

* cited by examiner

*Primary Examiner* — Timothy Hannon
(74) *Attorney, Agent, or Firm* — McCoy Russell LLP

(57) ABSTRACT

Methods and systems for a transmission are provided. The method includes estimating a stroke position of the hydraulic control piston based on a pressure of a fluid in a hydraulic line and a valve and a coefficient of the hydraulic line, where the hydraulic line is coupled to a chamber of the hydraulic control piston. The method further includes controlling a pressure of fluid delivered from the valve to the hydraulic control piston based on the estimated stroke position to achieve a piston stroke set-point during a filling phase.

20 Claims, 5 Drawing Sheets

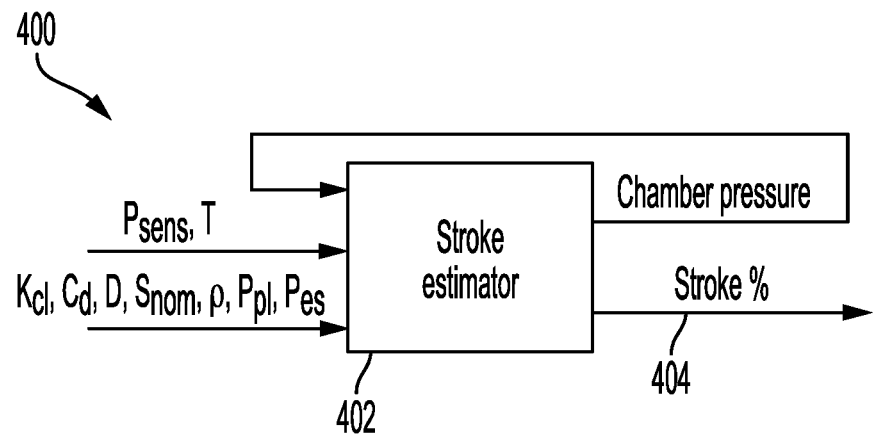
FIG. 4
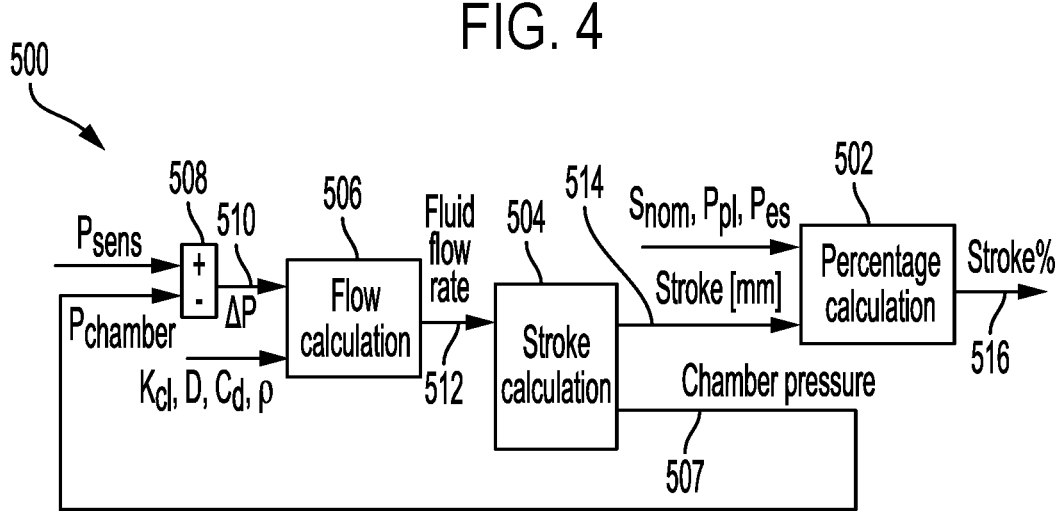
FIG. 5
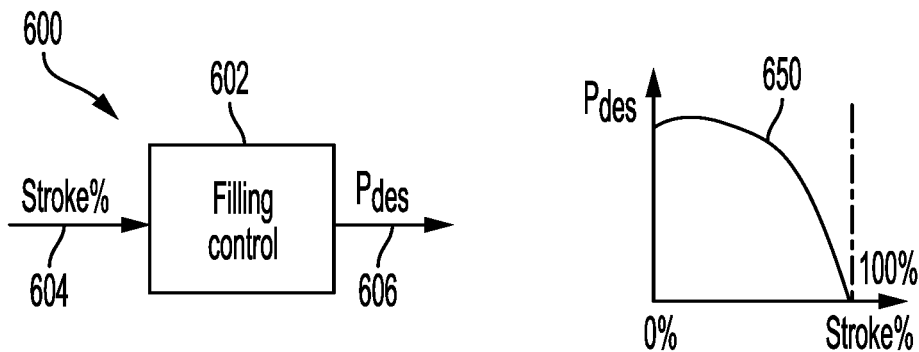
FIG. 6A
FIG. 6B

HYDRAULIC SYSTEM AND PISTON FILLING CONTROL

CROSS REFERENCE TO RELATED APPLICATION

The present application claims priority to U.S. Provisional Application No. 63/169,056, entitled "HYDRAULIC SYSTEM AND PISTON FILLING CONTROL", and filed on Mar. 31, 2021. The entire contents of the above-listed application are hereby incorporated by reference for all purposes.

TECHNICAL FIELD

The present disclosure relates to a hydraulic system and a control method for filling a hydraulic piston.

BACKGROUND AND SUMMARY

Filling schemes for control pistons, such as clutch control pistons, have previously involved the identification of piston chamber filling time in an attempt to provide accurate filling and clutch engagement. This filling time may be calibrated during manufacturing and may affect the clutch's torque transfer performance.

U.S. Pat. No. 8,308,608 B2 to Wilke et al. teaches a method for filling a clutch chamber in an automatic transmission. In the filling method, the fill time for the clutch chamber is determined based on the chamber volume, the oil flow rate, and the flow rate limit. Further, in Wilke's system a module uses a convoluted procedure to estimate the clutch's desired fill pressure. Both the fill pressure and fill time are then utilized in an initial stage of clutch actuation.

The inventors have recognized several drawbacks with Wilke's piston filling strategy as well as other prior piston filling control strategies. For instance, Wilke's filling time is adapted for changing environmental conditions, such as oil viscosity, which is difficult to model. Consequently, the filling time estimation may not only be processing intensive but exhibit inaccuracies, under certain conditions. Further, Wilke's system and other piston filling systems do not take into account piston position which may lead to unreliable estimation of the clutch's reengagement point and therefore cause further filling inaccuracies. These filling control misestimations may lead to an underfill or an overfill conditions of the piston chamber which results in undesirable shifting performance (e.g., torque spikes). Specifically, when underfill occurs, the piston does not reach an end stroke during a filling phase, causing an unwanted torque spike later in the modulation phase. On the other hand, when overfill occurs the piston reaches the end stroke before the end of the filling phase, causing torque oscillations when the modulation stroke begins.

The inventors have recognized the aforementioned challenges and developed a method for operation of a hydraulic control piston in a transmission clutch to at least partially address the challenges. The method includes estimating a stroke position of the hydraulic control piston based on a pressure of a fluid in a hydraulic line and a coefficient of the hydraulic line. The hydraulic line is coupled to a chamber of the hydraulic control piston and a valve. The method further includes controlling a pressure of fluid delivered from the valve to the hydraulic control piston based on the estimated stroke position to achieve a piston stroke set-point during a filling phase. The piston stroke set-point may be an end stroke value, in one example. In this way, the piston stroke value may be used to accurately fill the clutch. Consequently, the clutch's torque transfer during a modulation phase can be smoothed out while reducing the chance of an underfill or overfill condition which may each cause unwanted torque spikes during clutch modulation. Clutch performance may therefore be increased.

Further, in one example, the method may further include, at a predetermined time interval, calibrating the hydraulic line coefficient using a series of clutch filling events. This calibration further increases filling control accuracy and diminishes the likelihood of the clutch underfilling or overfilling and the torque spikes that may stem from clutch underfill and overfill.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

FIG. 4 is a piston stroke estimation module.

FIG. 5 is a more detailed architecture for piston stroke estimation.

FIG. 6A is a piston filling control architecture.

FIG. 6B is a graphical representation of a filling control strategy.

DETAILED DESCRIPTION

A transmission system with a hydraulic clutch and a clutch control assembly is described herein. The clutch control assembly is designed to efficiently and accurately calculate a stroke position of a control piston for the clutch. From the stroke position, a control pressure for the hydraulic valve that supplies fluid to a chamber of the piston may then be ascertained to effectively control the clutch during a shifting event, for example. To achieve the stroke estimation accuracy, the estimator module may use a sensed hydraulic line pressure, a hydraulic line coefficient, a fluid temperature, a nominal piston stroke value, a piston end stroke pressure, a fluid density, and/or a hydraulic line diameter as inputs. To further reduce the complexity of the piston stroke estimation, an orifice may be placed in the hydraulic line. Using the orifice in this manner concentrates the majority of the hydraulic losses in the orifice. Consequently, the use of fluid viscosity in the stroke estimation may be forgone, if desired. As such, considerations of environmental factors in the calculation may be avoided, enabling the piston stroke estimator to provide consistent and accurate stroke estimation outputs. Clutch engagement may therefore unfold in an even smoother manner with a diminished chance of torque spike events caused by piston overfilling or underfilling.

Figure 1:
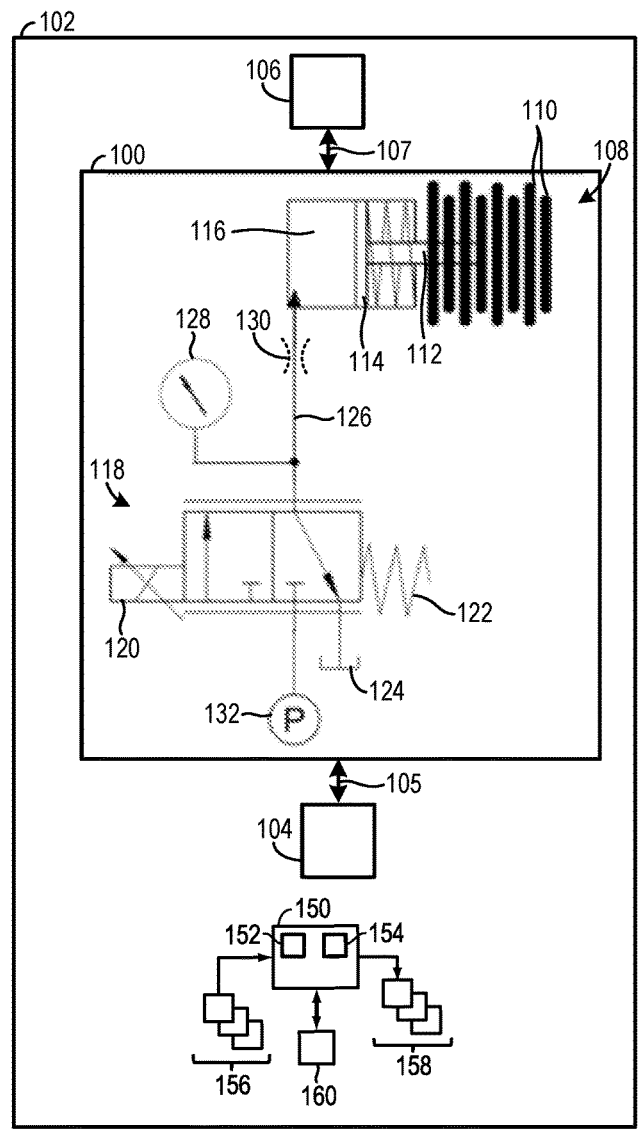
FIG. 1 is a schematic representation of a transmission system with a hydraulically controlled clutch.
Figure 2:
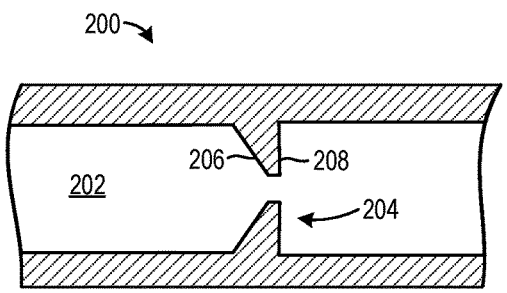
FIG. 2 is an example of an orifice in a hydraulic control line.
Figure 3:
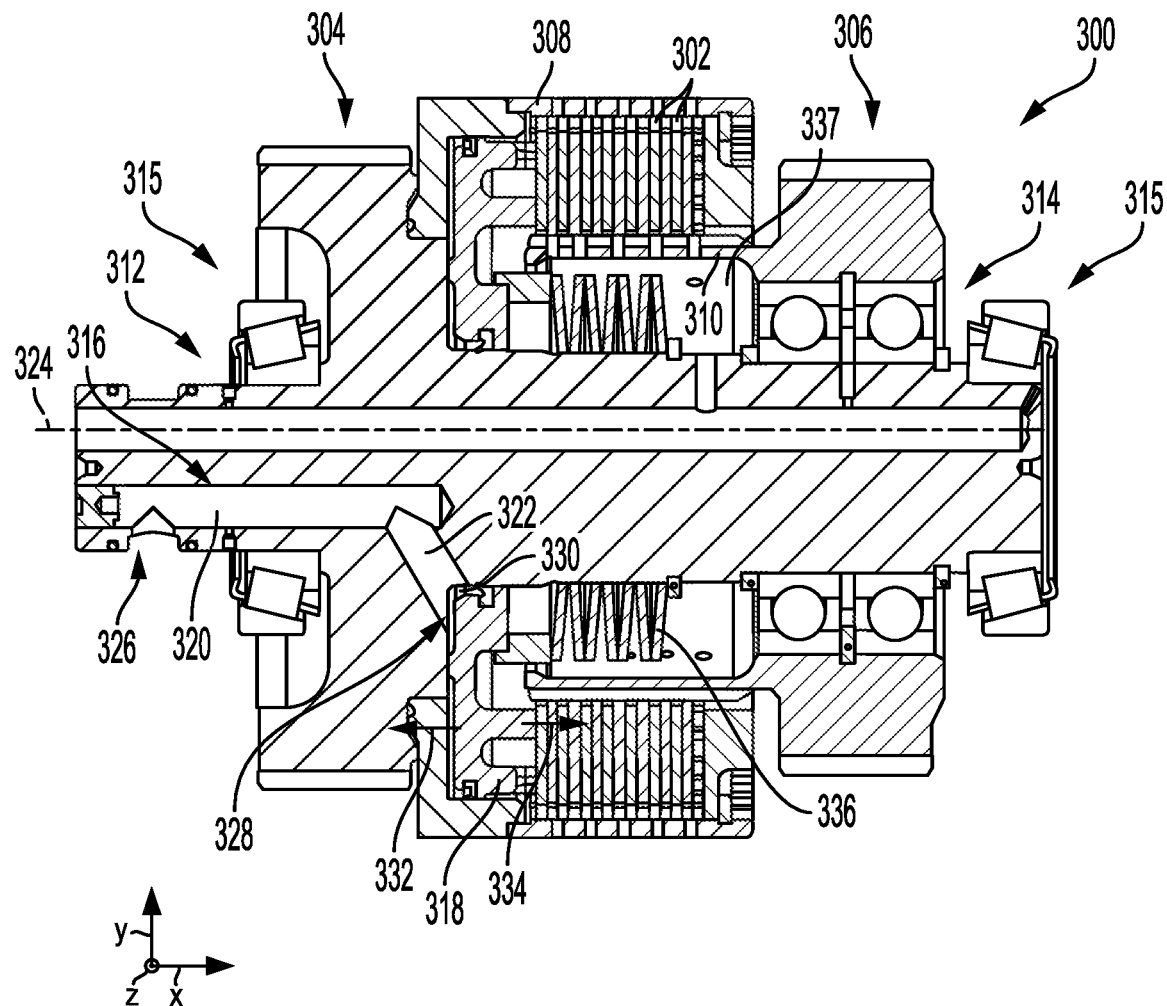
FIG. 3 is a first example of a transmission clutch and hydraulic control system.

FIG. 1 illustrates a transmission system with a clutch control assembly that is designed to reduce torque spikes during clutch engagement. FIG. 2 shows an example of an orifice in a hydraulic line that may be used concentrate flow losses at the orifice to simplify a piston stroke estimation calculation as well as increase hydraulic line damping, thereby permitting smooth modulation control. FIG. 3 shows a detailed illustration of a clutch control assembly and FIGS. 4-9 depict different clutch control strategies for clutch filling and modulation which predict piston position. FIG. 3 is drawn approximately to scale, although other relative component dimensions may be used, in other embodiments.

FIG. 1 illustrates a transmission system 100 that may be included in a vehicle 102. The transmission is designed to modulate the application of power between upstream and downstream components. For instance, power may be transferred between the transmission and a power source 104 (e.g., engine, electric machine (e.g., motor-generator), combinations thereof, and the like), indicated via arrows 105 as well as between the transmission and driveline components 106 (e.g., axles, drive wheels, and the like) indicated via arrows 107. Gears, belts, shafts, clutches, and the like may be used to implemented the abovementioned power transfer.

The transmission system 100 includes a clutch assembly 108 (e.g., clutch pack) which may include friction and spacer plates 110 (e.g., discs). One set of plates may be coupled to an upstream component (e.g., shaft, gear, and the like) and the other set of plates may be coupled a downstream component (e.g., shaft, gear, and the like). When engaged, the clutch plates permit torque transfer between the upstream and downstream components. Conversely, when disengaged torque transfer between the plates does not occur. The transmission system 100 may be an automatic transmission designed to automatically shift between gears based on engine or motor speed and/or load. For instance, the transmission may upshift responsive to a load increase and may downshift responsive to a speed increase. This automatic shifting strategy may be stored as logic in memory that is executable by a processor.

The transmission system 100 further includes an actuation shaft 112 coupled to one of the sets plates. The shaft 112 is attached to a hydraulic control piston 114. The hydraulic control piston 114 is positioned in a piston chamber 116 with hydraulic fluid (e.g., oil) therein. The pressure of said hydraulic fluid is altered via a hydraulic control valve 118. The control valve 118 is illustrated as a 3/2-way valve. As such, in a first valve positon fluid is directed to the piston chamber 116 and, conversely in a second valve position, fluid is directed out of the piston chamber. The valve 118 may be adjusted via a solenoid 120 or other suitable actuator and includes a spring 122 and/or a line coupled to an oil reservoir 124. However, other suitable valve configurations have been contemplated. In this way, the clutch pack may be electro-hydraulically actuated.

A hydraulic line 126 extends between the piston chamber 116 and the control valve 118. In this way, the chamber and the hydraulic control valve 118 are in fluidic communication. A sensor 128 designed to sense a pressure of the fluid in the hydraulic line 126 may be coupled to the line. As such, the sensor 128 may be positioned upstream of the piston chamber 116 and specifically may be positioned upstream of an orifice 130. Further, the control system may not include a pressure sensor in the filling chamber 116 and/or a piston position sensor designed to detect the position of piston 114, in one example. In this way, the system may be simplified.

Further, in one example, the orifice 130 may be included in the hydraulic line 126. The orifice may concentrate a high percentage of (e.g., the majority or substantially all of) the hydraulic flow losses in the orifice. As a result, fluid properties such as fluid viscosity (e.g., Reynolds number) may be ignored in stroke estimation calculations, if wanted. These stroke estimation calculations are discussed in greater detail herein with regard to FIGS. 4-5. This enables the stroke estimator to provide a more accurate calculation that is repeatable. Further, the orifice increases hydraulic line damping that lowers the resonance amplitude and increases the resonance frequency, thereby permitting smooth modulation control. Consequently, clutch performance may be increased. A pump 132 may be coupled to the hydraulic control valve 118 and is designed to supply the valve with fluid.

The transmission system 100 may further include a controller 150 with memory 152 and a processor 154. The memory 152 may hold instructions stored therein that when executed by the processor cause the controller 150 to perform the various methods, control strategies, calibration techniques, and the like, described herein. The processor 154 may include a microprocessor unit and/or other types of circuits. The memory 152 may include known data storage mediums such as random access memory, read only memory, keep alive memory, combinations thereof, and the like.

The controller 150 may receive vehicle data and various signals from sensors 156 positioned in different locations in the transmission system 100 and/or the vehicle 102. The sensors may include speed sensors, temperature sensors, pressure sensors such as the pressure sensor 128, and the like.

The controller 150 may send control signals to actuators 158, such as an actuator in the hydraulic pump 132 to adjust the pump's flowrate. Additionally, the control valve 118 may receive commands from the controller to induce clutch engagement and disengagement. The other controllable components in the transmission and vehicle may function in a similar manner with regard to control commands and actuator adjustment. Further, an input device 160 (e.g., shift selector, accelerator pedal, brake pedal, combinations thereof, and the like) may be in electronic communication with the controller 150.

FIG. 2 shows a detailed of an example of an orifice 200 in a hydraulic line 202. The orifice 200 is an example of the orifice 130, illustrated in FIG. 1. The orifice 200 may include restriction extension 204 with a leading surface 206 and a trailing surface 208. The extension 204 radially extends inward to reduce the cross-sectional flow area of the hydraulic line 202. The size of the flow restriction may be selected based on the properties of the hydraulic fluid, the size of the upstream pump, the volume of the piston chamber, and the like.

FIG. 3 shows a first example of a clutch assembly 300. The clutch assembly 300 is an example of the clutch assembly 108, depicted in FIG. 1. As such, the clutch assemblies may share common structural and/or functional features. Redundant description of these overlapping features is therefore omitted for brevity.

The clutch assembly 300 includes multiple plates 302. A first set of the plates are rotationally coupled to a first gear 304 and a second set of the plates are coupled to a second gear 306. Axial extensions 308, 310 may permit attachment between the different sets of plates and the gears 304, 306.

Frictional engagement and disengagement of the plates cause closing and opening of the clutch where torque transfer from the first gear 304 and the second gear 306 is permitted and inhibited, respectively.

The first gear 304 is coupled to a shaft 312. Bearings 314 (e.g., ball bearings) are coupled to the second gear 306 and the shaft 312 to permit independent rotation of these components. Further, bearings 315 (e.g., roller bearings) may be coupled to opposing sides of the shaft 312. The bearings described herein include inner races, outer races, and roller elements.

A hydraulic passage 316 provides fluidic communication between a hydraulic control piston 318 and upstream actuation components such as the control valve (e.g., the valve 118 depicted in FIG. 1). The hydraulic passage 316 may include a first section 320 that axially extends through the shaft 312 and a second section 322 that extends at an angle away from the shaft's rotational axis 324. Further, the first section 320 includes an inlet 326 in fluidic communication with upstream components while the second section 322 includes an outlet 328 that opens into the piston chamber 330. In this way, the hydraulic passage may be efficiently routed through the shaft. However, other hydraulic passages arrangements may be used, in other examples. For instance, a hydraulic conduit distinct from the shaft may be routed to the control piston 318, which may however decrease the system's space efficiency.

Responsive to changes in the pressure applied to the hydraulic control piston 318, the piston moves in opposing axial directions, indicated via arrows 332, 334. As such, an increase in hydraulic pressure moves the piston 318 in the direction 334, thereby inducing clutch engagement. Conversely, a decrease in hydraulic pressure moves the piston 318 in the direction 332, thereby inducing clutch disengagement. A spring 336 coupled to the piston allows the piston to move in direction 332 during disengagement. As such, the spring 336 may be loaded during engagement and unloaded during disengagement. The spring 336 may be arranged in an opening 337 between the shaft 312 and the extension to provide a space efficient clutch layout. However, other suitable clutch arrangements may be used, in other examples.

FIG. 4 depicts a hydraulic actuation architecture 400 with a stroke estimation module 402. The stroke estimation module 402 may be executed in real time or near real time to decrease clutch control latency, in one example. In this way, clutch performance may be enhanced. This architecture as well as the other programmatic architectures described herein may be used via a control system for a hydraulically controlled clutch such as the hydraulic clutch assemblies 108, 300 depicted in FIGS. 1 and 3. As described herein, a logic module is a set of instructions (e.g., tasks, algorithms, and the like) that performs selected operations, functions, and the like, when executed. As such, the stroke estimation module 402 may be stored in memory of a controller, such as the controller 150 shown in FIG. 1. It will be appreciated that the stroke estimation module may be executed to determine the position of the piston without knowledge of the piston, from a sensor (e.g., a piston position sensor, a pressure switch or sensor in the filling chamber, and the like), for instance. In this way, the number of sensors in the system may be reduced, thereby reducing the control system's complexity.

The inputs for the stroke estimation module 402 include the pressure ($P_{sens}$) of fluid in the hydraulic line coupled to the chamber and the valve. This pressure may be determined via a sensor (e.g., the sensor 128, shown in FIG. 1). The stroke estimation module 402 inputs may further include a coefficient ($C_d$) of the hydraulic line. The hydraulic line flow coefficient is a design parameter which may depend on the fluid's Reynolds number and other factors. Using the fluid line pressure and the hydraulic line coefficient in a piston stroke estimation algorithm may decrease errors, thereby increasing the control system's stability and clutch engagement performance.

When an orifice (e.g., thin-walled orifice) is placed in the hydraulic line that extends between the control valve and piston chamber, a high percentage (e.g., the majority) of the hydraulic losses may be concentrated in the orifice. Concentrating flow losses in the orifice creates a desired environment where fluid properties such as fluid viscosity (e.g., Reynolds number) may not be relevant and therefore omitted from the stroke estimation calculation. Consequently, the piston stroke estimation may be less computationally intensive and provide results that have greater consistency and accuracy when an orifice is incorporated into the hydraulic line. As a result, the computational efficiency of the control system may be increased. The orifice further provides increased hydraulic line damping which lowers the resonance amplitude and increases the resonance frequency. This results in a smoother modulation control of the clutch. Further, in some examples, due to the concentration of the losses in the orifice, the profile (e.g., the size) of orifice in the hydraulic line corresponding to fluid resistance may be used to calculate the coefficient of the hydraulic line.

A temperature (T) of the hydraulic fluid may further be used as an input for the stroke estimation module 402 along with hydraulic line diameter (D), the nominal piston stroke ($S_{nom}$), the fluid density ($\rho$), the static pressure demanded to counterbalance the clutch spring preload ($P_{pl}$) and to reach the piston end of stroke pressure ($P_{es}$). Alternatively, when the spring is not included in the clutch, the static pressure demanded to counterbalance $P_{pl}$ may be omitted from the stroke estimation calculation.

A clutch coefficient ($K_{cl}$) which takes into account hardware dispersion may further be used as an input for the stroke estimation module. The clutch coefficient may be calibrated for each distinct clutch. Using the clutch coefficient permits the stroke estimator to more consistently calculate the estimated stroke. In this way, the consistency of each clutch may be enhanced.

The stroke estimation module 402 may further output an estimated chamber pressure and feed this estimated chamber pressure back into the model's input. The feedback of the chamber pressure decreases instabilities in the stroke estimation.

The stroke estimation module may additionally output a predicted piston position 404 that may be expressed as a percentage, where 100% corresponds to a piston end stroke position where clutch plates are frictionally engaged. The predicted piston position 404 may be subsequently used for efficient clutch control, discussed in greater detail herein with regard to FIGS. 6A and 6B.

FIG. 5 shows a more detailed a hydraulic actuation architecture 500 for a hydraulic clutch. This architecture includes a stroke percentage calculation module 502, stroke calculation module 504, flow calculation module 506, and a pressure differential module 508. Inputs for the pressure differential module include a pressure of the hydraulic line that may be sensed as well as an estimated chamber pressure 507 that is fed back to the pressure differential module 508 from the stroke calculation module 504.

The pressure differential module 508 may output a pressure differential 510 and send it to the flow calculation module 506 as an input. Other inputs to the flow calculation module 506 may include $K_{cl}$, D, $C_d$, and/or ρ. From these inputs, the flow calculation module outputs a fluid flow rate 512 which is fed into the stroke calculation module 504 as an input. From the fluid flow rate, the stroke calculation module outputs a stroke position 514 which may be expressed in millimeters (mm) and the chamber pressure 507. The stroke position 514 is input into the percentage calculation module 502 along with the $S_{nom}$, $P_{pl}$, and/or $P_{es}$. Using these inputs, the percentage calculation module 502 outputs a stroke positon 516 that may be expressed as percentage. As such, 100% stroke may correspond to an end stroke of the piston or a value that is approaching the end stroke.

FIG. 6A shows a hydraulic valve control architecture 600 with a filling control module 602. The filling control module 602 uses the estimated stroke value 604 which may be output from the percentage calculation module 502 depicted in FIG. 5. The filling control module 602 then uses the estimated stroke value to determine a desired valve pressure ($P_{des}$). Specifically, the filling control function may be designed to calculate $P_{des}$ by solely knowing the estimated piston stroke value 604 (e.g., piston percentage stroke) determined by the stroke estimator. As such, the filling control module 602 processes the piston stroke and provides the valve desired pressure 606. In this way, the processing resources used by the filling control module may be decreased when compared to more complex algorithms.

The values of $P_{des}$ may be stored in a look-up table that may correspond to the plot 650 shown in FIG. 6B. Specifically, FIG. 6B shows a correspondence between $P_{des}$ and the stroke percentage, where $P_{des}$ is on the ordinate and stroke percentage is on the abscissa. In other examples, the valve may be controlled based on stroke speed.

Figure 7:
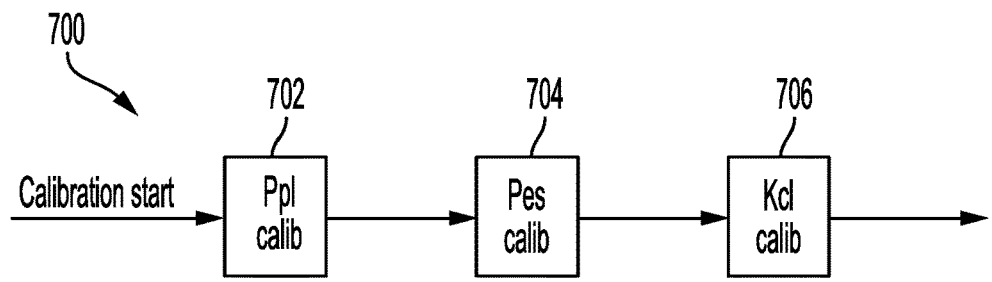
FIG. 7 is a calibration architecture for the piston stroke estimation.

The stroke estimation calculation may rely on several design parameters, such as "$P_{pl}$", "$P_{es}$", "$C_d$", and the like. These parameters may be influenced by manufacturing dispersion, clutch wear, and other factors. As such, it may be desirable to accurately calibrate the parameters based on the specific hardware used in the clutch system. FIG. 7 shows a calibration architecture 700 that provides accurate calibration of these design parameters. Specifically, the calibration procedure may be implemented at predetermined intervals during the transmission's lifecycle to accurately predict $P_{pl}$, $P_{es}$, and $K_{cl}$ which may take into consideration dispersion on the $S_{nom}$, D, $C_d$, and/or on other factors involved in the stroke. For example, the calibration procedure may be implement every 1,000, 2,000, or 3,000 hours of transmission use. The calibration architecture 700 may include a preload pressure module 702, an end stroke pressure module 704, and a clutch constant module 706 that may be sequentially implemented for instance. The calibration may begin by executing the preload pressure module 702 in which $P_{pl}$ is calibrated through statistical analysis of clutch discharge time. Next, the end stroke pressure module 704 may be executed where $P_{es}$ is calibrated through an interpolation of clutch torque points. Next, the clutch constant module 706 is executed which may involve calibrating $K_{cl}$ using a series of clutch filling events and a numerical method for convergence. However, other suitable calibration techniques have been contemplated.

Figure 8:
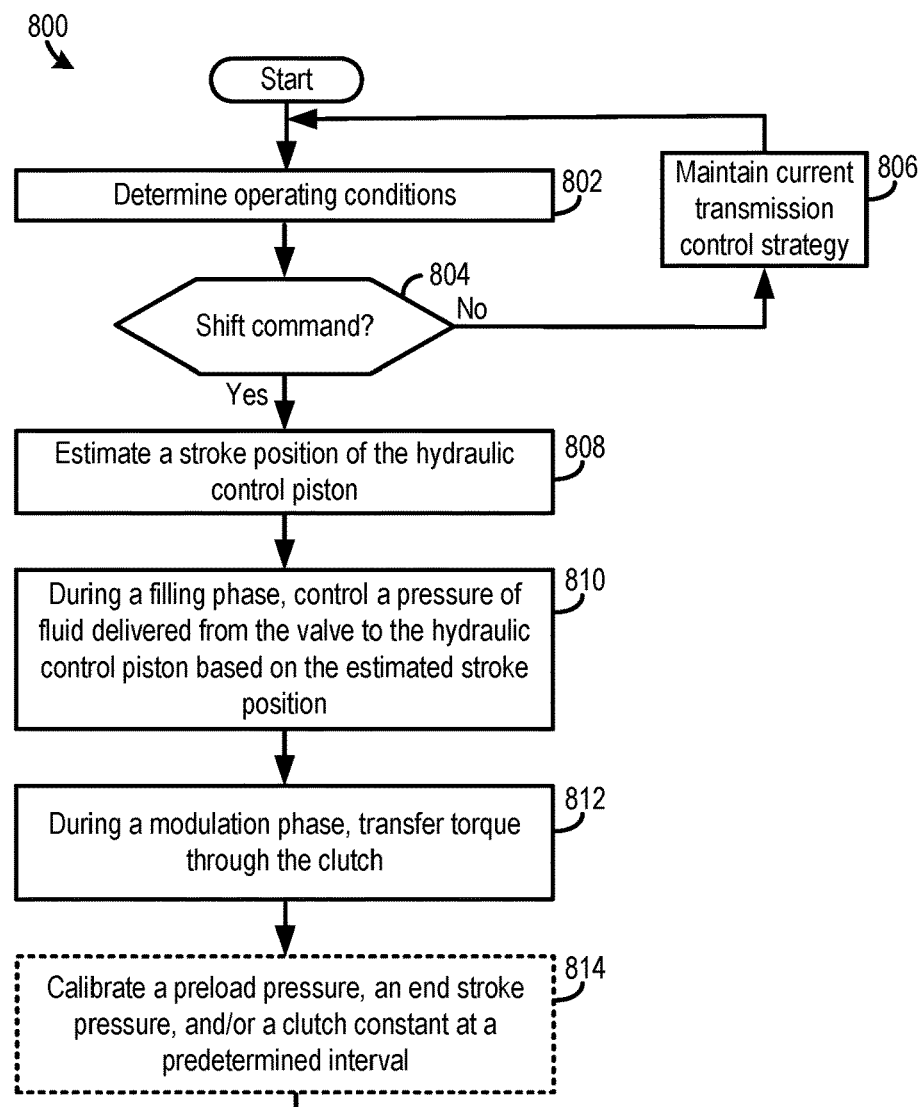
FIG. 8 is a method for hydraulically operating a transmission clutch.

FIG. 8 shows a method 800 for operation of a system for a transmission clutch. The method 800 may be carried out by the transmission system and components described above with regard to FIGS. 1-3 as well as the stroke estimation, clutch control, and clutch calibration architectures depicted in FIGS. 4-7, in one example. However, in other examples, the method 800 may be implemented using other suitable systems, components, as well as control and calibration architectures. Further, the method may be carried out as instructions stored in memory executed by a processor in a controller. As such, performing the method steps may include receiving inputs from sensors and sending and/or receiving commands which trigger adjustment of associate components using actuators, as previously indicated.

At 802, the method includes determining operating conditions. The operating conditions may include a hydraulic line pressure determined based on a pressure sensor coupled to the line, pump speed, engine speed, engine load, input device position (e.g., pedal position, gear selector position, and the like), and the like.

At 804, the method judges if a shift command should be generated by the controller. A shift command may be automatically generated by the controller responsive to a change in vehicle speed or load. For example, a shift may be initiated in response to transmission speed or load approaching, reaching, or surpassing a threshold value.

If it is judged that a shift command should not be generated (NO at 804) the method moves to 806 where the method includes maintaining the current transmission control strategy. For instance, the transmission may remain in the current gear and the engine or motor may be adjusted to meet a power request from an operator.

Conversely, if it is judged that a shift command should be generated (YES at 804) the method include at 808 estimating a stroke position of the hydraulic control piston using the stroke estimation module. The module may use sensed hydraulic line pressure, hydraulic line coefficient, fluid temperature, nominal piston stroke value, piston end stroke pressure, fluid density, and/or hydraulic line diameter as inputs, as previously discussed. It will be understood that this stroke estimation calculation may be implemented in system without a piston position sensor. In this way, the stroke estimation calculation may provide a predicted value of a previously unknown parameter. Further, the stroke estimation calculation may be implemented in real time or near real time.

Next at 810, the method includes, during a filling phase, controlling a pressure of fluid delivered from the valve to the hydraulic control piston based on the estimated stroke position. For instance, a look-up table with a desired valve pressure mapped to the estimated piston stroke percentage may be used to generate the desired valve pressure and corresponding valve control command. In this way, the estimated piston position is used to provide targeted clutch reengagement during the filling phase.

At 812, the method includes during a modulation phase, transferring torque through the clutch. Said torque transmission may smoothly occur with a decreased chance of torque spikes, due to the accuracy of the piston stroke estimation.

At 814, the method may include calibrating a preload pressure, an end stroke pressure, and/or a clutch constant at a predetermined interval. The calibration procedures discussed above with regard to FIG. 7 may be used at step 814. Method 800 allows a piston stroke estimation to be used to increase the clutch control accuracy without prior knowledge of the piston stroke.

The technical effect of the transmission systems and transmission clutch operating methods described herein is to decrease clutch control errors to reduce the chance of clutch overfill or underfill that causes torque spikes during clutch actuation. Consequently, shifting performance is increased.

Figure 9:
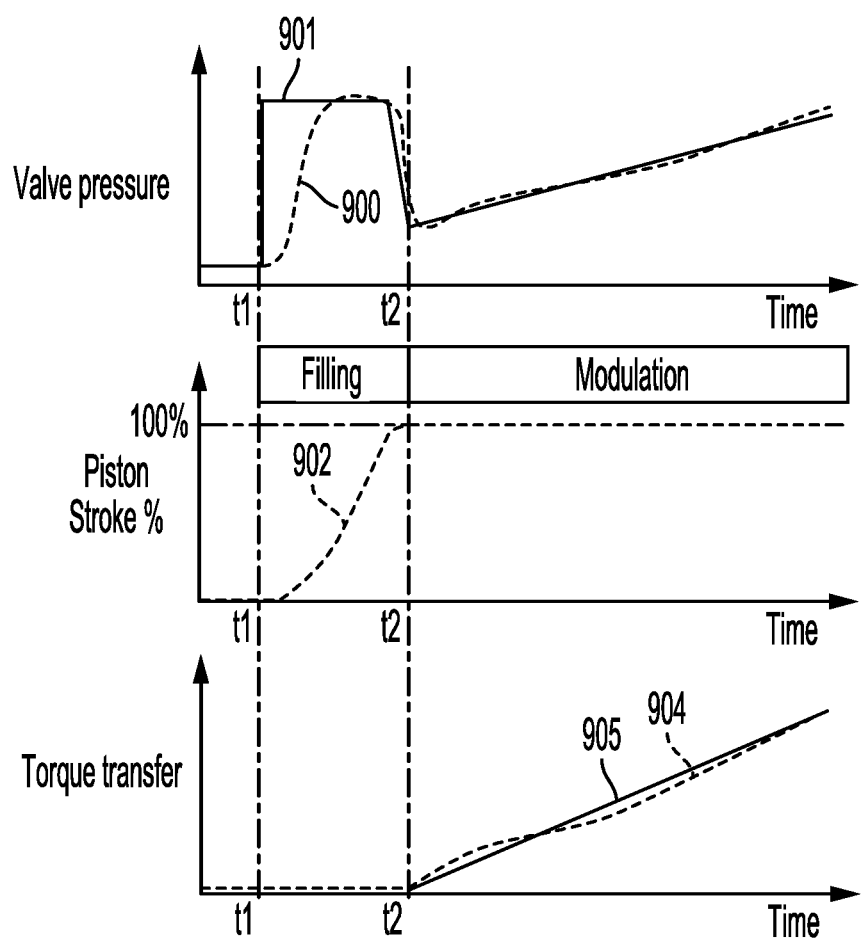
FIG. 9 is a graphical representation of a use-case prefill, filling, and modulation phases for a hydraulic clutch control piston.

FIG. 9 depicts a use-case clutch filling strategy with plots 900, 901 of an actual and set-point valve pressure vs. time, plot 902 of actual piston stroke percentage vs. time, and plots 904, 905 of actual and set-point torque transfer vs. time. The clutch filling strategy depicted in FIG. 9 enables the torque transfer through the clutch to take place without significant spikes. This smooth torque transfer may be achieved using the hydraulic clutch actuation techniques described above with regard to FIGS. 1-8.

From t0 to t1 the hydraulic actuation assembly for the clutch is in a pre-fill stage. At t1, the valve pressure set-point is increased and the actual valve pressure closely follows the set-point. Consequently, from t1 to t2, the piston stroke percentage increases. At t2, the piston reaches the end stroke (e.g., 100%) and torque transfer through the clutch begins. After t2, the torque transfer set-point through the clutch closely matches the actual torque transfer and progresses smoothly. In this way, shifting performance in the transmission may be increased.

FIGS. 1-3 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a method for operation of a hydraulic control piston in a transmission clutch is provided that comprises estimating a stroke position of the hydraulic control piston based on: a pressure of a fluid in a hydraulic line coupled to a chamber of the hydraulic control piston and a valve; and a coefficient of the hydraulic line; and controlling a pressure of the fluid delivered from the valve to the hydraulic control piston based on the estimated stroke position to achieve a piston stroke set-point during a filling phase. The method may further comprise, in a modulation phase where a speed of the hydraulic control piston is zero or approaching zero, increasing torque transfer through the transmission clutch, wherein the modulation phase is subsequent to the filling phase, in one example. In yet another example, the method may further comprise, at a predetermined time interval, calibrating the coefficient of the hydraulic line using a series of clutch filling events.

In another aspect, a clutch assembly in an automatic transmission is provided that comprises a control valve designed to adjust a pressure of a fluid in a hydraulic line that extends between the control valve and a chamber of a hydraulic control piston; a shaft coupled to the hydraulic control piston and a plurality of clutch plates; and a controller including: instructions that when executed, during a filling phase, cause the controller to: estimate a stroke position of the hydraulic control piston based on a pressure of the fluid in the hydraulic line and a coefficient of the hydraulic line; and control a pressure of the fluid delivered from the control valve to the hydraulic control piston based on the estimated stroke position to achieve a piston stroke set-point.

In yet another aspect, a method for operation of a hydraulic control piston in a clutch of an automatic transmission is provided that comprises, in real time or near real time, estimating a stroke position of the hydraulic control piston based on a pressure of a fluid in a hydraulic line, a nominal piston stroke value, a piston end stroke pressure, and a coefficient of the hydraulic line; and controlling a pressure of the fluid delivered from a valve to the hydraulic control piston based on the estimated stroke position to achieve piston stroke set-point; wherein the hydraulic line extends between a chamber of the hydraulic control piston and the valve. The method may further comprise, at a predetermined time interval, calibrating the piston end stroke pressure via an interpolation of a plurality of clutch torque points and calibrating the coefficient of the hydraulic line using a series of clutch filling events, in one example.

In any of the aspects or combinations of the aspects, the coefficient of the hydraulic line may be determined based on a profile of an orifice positioned within the hydraulic line.

In any of the aspects or combinations of the aspects, the stroke position may be estimated based on a temperature of the fluid and a pressure of a piston chamber.

In any of the aspects or combinations of the aspects, the stroke position may be estimated based on a nominal piston stroke value, a piston end stroke pressure, a density of the fluid, and a hydraulic line diameter.

In any of the aspects or combinations of the aspects, the piston stroke set-point may be an end stroke value.

In any of the aspects or combinations of the aspects, a spring may be coupled to the hydraulic control piston; and the stroke position of the hydraulic control piston may be estimated based on a spring preload pressure.

In any of the aspects or combinations of the aspects, the clutch assembly may further comprise an orifice positioned in the hydraulic line.

In any of the aspects or combinations of the aspects, the coefficient of the hydraulic line may be determined based on a profile of the orifice.

In any of the aspects or combinations of the aspects, the controller may further include: instructions that when executed, during a periodic calibration procedure, cause the controller to: calibrate the coefficient of the hydraulic line using a series of clutch filling events.

In any of the aspects or combinations of the aspects, the clutch assembly may further comprise a pressure sensor coupled to the hydraulic line and wherein the pressure in the hydraulic line is determined using inputs from the pressure sensor.

In any of the aspects or combinations of the aspects, the stroke position may be estimated based on a clutch coefficient.

In any of the aspects or combinations of the aspects, the hydraulic line may internally extend through a shaft.

In any of the aspects or combinations of the aspects, the coefficient of the hydraulic line may be determined based on a profile of an orifice positioned within the hydraulic line.

In any of the aspects or combinations of the aspects, the stroke position may be estimated based on a temperature of the fluid, a pressure of a piston chamber, a density of the fluid, and a hydraulic line diameter.

In any of the aspects or combinations of the aspects, the stroke position may be estimated using a predicted piston chamber volume.

In another representation, a hydraulic clutch control method is provided that comprises, without using a piston stroke position sensor, predicting a position of a hydraulic control piston in a chamber using a sensed pressure in a line that delivers oil to the chamber.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the vehicle and/or transmission control system, where the described actions are carried out by executing the instructions in a system including the various hardware components in combination with the electronic controller. One or more of the method steps described herein may be omitted if desired.

While various embodiments have been described above, it should be understood that they have been presented by way of example, and not limitation nor restriction. It will be appreciated that the configurations and routines disclosed herein are exemplary in nature, and that these specific examples are not to be considered in a limiting sense, because numerous variations are possible. For example, the above technology can be applied to powertrains that include different types of propulsion sources including different types of electric machines, internal combustion engines, and/or transmissions. The subject matter of the present disclosure includes all novel and non-obvious combinations and sub-combinations of the various systems and configurations, and other features, functions, and/or properties disclosed herein. It will be apparent to persons skilled in the relevant arts that the disclosed subject matter may be embodied in other specific forms without departing from the spirit of the subject matter.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

As used herein, the term "approximately" is construed to mean plus or minus five percent of the range, unless otherwise specified.

The invention claimed is:

1. A method for operation of a hydraulic control piston in a transmission clutch, comprising:
   estimating a stroke position of the hydraulic control piston based on:
      a pressure of a fluid in a hydraulic line coupled to a chamber of the hydraulic control piston and a valve;
      a clutch coefficient associated with the transmission clutch; and
      a coefficient of the hydraulic line; and
   controlling a pressure of the fluid delivered from the valve to the hydraulic control piston based on the estimated stroke position to achieve a piston stroke set-point during a filling phase.

2. The method of claim 1, wherein the coefficient of the hydraulic line is determined based on a profile of an orifice positioned within the hydraulic line.

3. The method of claim 1, wherein the stroke position is estimated based on a temperature of the fluid and a pressure of a piston chamber.

4. The method of claim 1, wherein the stroke position is estimated based on a nominal piston stroke value, a piston end stroke pressure, a density of the fluid, and a hydraulic line diameter.

5. The method of claim 1, wherein the piston stroke set-point is an end stroke value.

6. The method of claim 1, further comprising, in a modulation phase where a speed of the hydraulic control piston is zero or approaching zero, increasing torque transfer through the transmission clutch, wherein the modulation phase is subsequent to the filling phase.

7. The method of claim 1, further comprising, at a predetermined time interval, calibrating the clutch coefficient using a series of clutch filling events.

8. The method of claim 1, wherein:
   a spring is coupled to the hydraulic control piston; and
   the stroke position of the hydraulic control piston is estimated based on a spring preload pressure.

9. A clutch assembly in an automatic transmission, comprising:
   a control valve designed to adjust a pressure of a fluid in a hydraulic line that extends between the control valve and a chamber of a hydraulic control piston;
   a shaft coupled to the hydraulic control piston and a plurality of clutch plates in a clutch; and a controller including:
  instructions that when executed, during a filling phase, cause the controller to:
    estimate a stroke position of the hydraulic control piston based on a pressure of the fluid in the hydraulic line, a clutch coefficient of the clutch, and a coefficient of the hydraulic line; and
    control a pressure of the fluid delivered from the control valve to the hydraulic control piston based on the estimated stroke position to achieve a piston stroke set-point;
    wherein the clutch coefficient is a calibrated value that is determined based on hardware dispersion.

10. The clutch assembly of claim 9, further comprising an orifice positioned in the hydraulic line.

11. The clutch assembly of claim 10, wherein the coefficient of the hydraulic line is determined based on a profile of the orifice.

12. The clutch assembly of claim 9, wherein the controller further includes:
  instructions that when executed, during a periodic calibration procedure, cause the controller to:
    calibrate the clutch coefficient of the hydraulic line using a series of clutch filling events.

13. The clutch assembly of claim 9, further comprising a pressure sensor coupled to the hydraulic line and wherein the pressure in the hydraulic line is determined using inputs from the pressure sensor.

14. The clutch assembly of claim 9, wherein the stroke position is estimated based on a clutch coefficient.

15. The clutch assembly of claim 9, wherein the hydraulic line internally extends through the shaft.

16. A method for operation of a hydraulic control piston in a clutch of an automatic transmission, comprising:
  in real time or near real time, estimating a stroke position of the hydraulic control piston based on a pressure of a fluid in a hydraulic line, a nominal piston stroke value, a piston end stroke pressure, a clutch coefficient of the clutch, and a coefficient of the hydraulic line; and
  controlling the pressure of the fluid delivered from a valve to the hydraulic control piston based on the estimated stroke position to achieve piston stroke set-point;
  wherein the hydraulic line extends between a chamber of the hydraulic control piston and the valve;
  wherein the clutch coefficient is a calibrated value that is determined based on hardware dispersion.

17. The method of claim 16, wherein the coefficient of the hydraulic line is determined based on a profile of an orifice positioned within the hydraulic line.

18. The method of claim 16, wherein the stroke position is estimated based on a temperature of the fluid, a pressure of a piston chamber, a density of the fluid, and a hydraulic line diameter.

19. The method of claim 16, further comprising, at a predetermined time interval, calibrating the piston end stroke pressure via an interpolation of a plurality of clutch torque points and calibrating the clutch coefficient using a series of clutch filling events.

20. The method of claim 16, wherein the stroke position is estimated using a predicted piston chamber volume.

* * * * *